(12) United States Patent
Sarasmo

(10) Patent No.: US 12,449,312 B2
(45) Date of Patent: Oct. 21, 2025

(54) APPARATUS FOR COUNTING OBJECTS

(71) Applicant: HALTIAN OY, Oulu (FI)

(72) Inventor: Marko Sarasmo, Oulu (FI)

(73) Assignee: Haltian Oy, Oulu (FI)

( * ) Notice: Subject to any disclaimer, the term of this patent is extended or adjusted under 35 U.S.C. 154(b) by 377 days.

(21) Appl. No.: 18/012,178

(22) PCT Filed: Jun. 17, 2021

(86) PCT No.: PCT/EP2021/066341
§ 371 (c)(1),
(2) Date: Dec. 21, 2022

(87) PCT Pub. No.: WO2022/002603
PCT Pub. Date: Jan. 6, 2022

(65) Prior Publication Data
US 2023/0258502 A1  Aug. 17, 2023

(30) Foreign Application Priority Data
Jun. 29, 2020 (EP) ..................................... 20182773

(51) Int. Cl.
*G01J 5/08* (2022.01)

(52) U.S. Cl.
CPC .................................. *G01J 5/0846* (2013.01)

(58) Field of Classification Search
CPC .............. G01J 5/0846; G01J 5/08; G07C 9/00
See application file for complete search history.

(56) References Cited

U.S. PATENT DOCUMENTS

| 4,882,491 A | 11/1989 | Tamura et al. |
| 6,183,130 B1 * | 2/2001 | Adams .................. G01J 5/0007 |
| | | 219/405 |

(Continued)

FOREIGN PATENT DOCUMENTS

| CA | 2470910 C | * 10/2012 | ............ G01J 5/0044 |
| CA | 3113438 A1 | * 10/2021 | ............ B23K 26/034 |
| EP | 2707748 B1 | *  9/2017 | ............... G01C 3/08 |

OTHER PUBLICATIONS

International Search Report and Written Opinion of the ISA dated Sep. 8, 2021, for PCT/EP2021/066341, 14 pp.

(Continued)

*Primary Examiner* — Kristina M Deherrera
*Assistant Examiner* — Julia Fitzpatrick
(74) *Attorney, Agent, or Firm* — Nixon & Vanderhye PC (57) ABSTRACT

Apparatus for counting objects is disclosed. Apparatus includes a power source (108), a radio transceiver (110), two or more passive infrared (PIR) sensors (120A, 120B, 120C), one or more memories (104) including computer program code (106), a processor (102) to execute the computer program code (106), and a mechanical field of view limiting structure (126A, 128A, 130A, 126B, 128B, 130B, 126C, 128C, 130C) configured to limit the field of view of each infrared-sensitive element. The apparatus is caused to: detecting (202), by the first PIR sensor, a first motion; detecting (204), by the second PIR sensor, a second motion; if the second motion is detected within a predetermined time period after the first motion, increasing an inward count, or if the first motion is detected within a predetermined time period after the second motion, increasing an outward count; and transmitting the inward/outward count.

11 Claims, 5 Drawing Sheets

(56) References Cited

U.S. PATENT DOCUMENTS

| | | | | |
|---|---|---|---|---|
| 7,611,278 B2* | 11/2009 | Hollander | ............. | G01J 5/0806 |
| | | | | 374/208 |
| 8,304,730 B2* | 11/2012 | Schulenburg | ........... | G01J 5/047 |
| | | | | 250/338.1 |
| 8,354,643 B2 | 1/2013 | Micko | | |
| 2005/0040947 A1 | 2/2005 | Buckley et al. | | |
| 2005/0043907 A1 | 2/2005 | Eckel et al. | | |
| 2012/0218086 A1 | 8/2012 | Miller et al. | | |
| 2016/0274225 A1* | 9/2016 | Reimer | ................. | G02B 7/028 |
| 2019/0012607 A1 | 1/2019 | Holliday et al. | | |
| 2020/0018651 A1* | 1/2020 | Montgomery | ........ | G01J 5/0808 |
| 2020/0082551 A1 | 3/2020 | Steiner | | |

OTHER PUBLICATIONS

Extended European Search Report dated Nov. 26, 2020, including the European Search Report and the European Search Opinion, for EP 20182773.0, 8 pp.

* cited by examiner

RIGHT WAY ROUND -VIEW    UPSIDE DOWN -VIEW

RIGHT WAY ROUND -VIEW    UPSIDE DOWN -VIEW

APPARATUS FOR COUNTING OBJECTS

CROSS-REFERENCE TO RELATED APPLICATIONS

This application is the U.S. national phase of International Application No. PCT/EP2021/066341 filed Jun. 17, 2021, which designated the U.S. and claims priority to EP 20182773.0 filed Jun. 29, 2020, the entire contents of each of which are hereby incorporated by reference.

FIELD

Various embodiments relate to an apparatus for counting objects.

BACKGROUND

Apparatuses for counting objects are well-known in the art. Examples of such systems are shown in US 2005/0043907 A1, U.S. Pat. No. 8,354,643, US 2019/0012607 A1 and US 2020/0082551 A1. These publications use passive infrared (PIR) sensors for detecting persons. However, these PIR sensors always use lenses (such as Fresnel lens) or (segmented or parabolic) mirrors for detecting the infrared radiation. The design of such lenses and mirrors may be time-consuming. Another problem is that lenses and mirrors may become dirty while in use, and careless cleaning may abrade such sensitive optics. An easily designed, cheap and robust apparatus for counting objects is desirable.

BRIEF DESCRIPTION

According to an aspect, there is provided an apparatus for counting objects, comprising: a power source, a radio transceiver, two or more passive infrared sensors, comprising a first passive infrared sensor and a second passive infrared sensor, each passive infrared sensor comprising at least two infrared-sensitive elements, a mechanical field of view limiting structure configured to limit the field of view of each infrared-sensitive element, wherein the field of views of each infrared-sensitive element within each passive infrared sensor are adjacent to each other, and the field of views between each passive infrared sensor are side by side, one or more memories including computer program code; and a processor to execute the computer program code to cause the apparatus to perform at least the following: detecting, by the first passive infrared sensor, a first motion of an object based on signal differential changes between its two infrared-sensitive elements, detecting, by the second passive infrared sensor, a second motion of the object based on signal differential changes between its two-infrared-sensitive elements, if the second motion is detected within a predetermined time period after the first motion, increasing an inward count of objects moving to a direction from the first passive infrared sensor to the second passive infrared sensor, or if the first motion is detected within a predetermined time period after the second motion, increasing an outward count of objects moving to a direction from the second passive infrared sensor to the first passive infrared sensor; and transmitting, using the radio transceiver, the inward count of objects and/or the outward count of objects, wherein the mechanical field of view limiting structure is a solid block with a separate cut-out for each infrared-sensitive element configured so that sides of the cut-out surround the infrared-sensitive element, and sides of the cut-out towards the objects are wider apart than sides of the cut-out towards the infrared-sensitive element.

LIST OF DRAWINGS

Some embodiments will now be described with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 1:
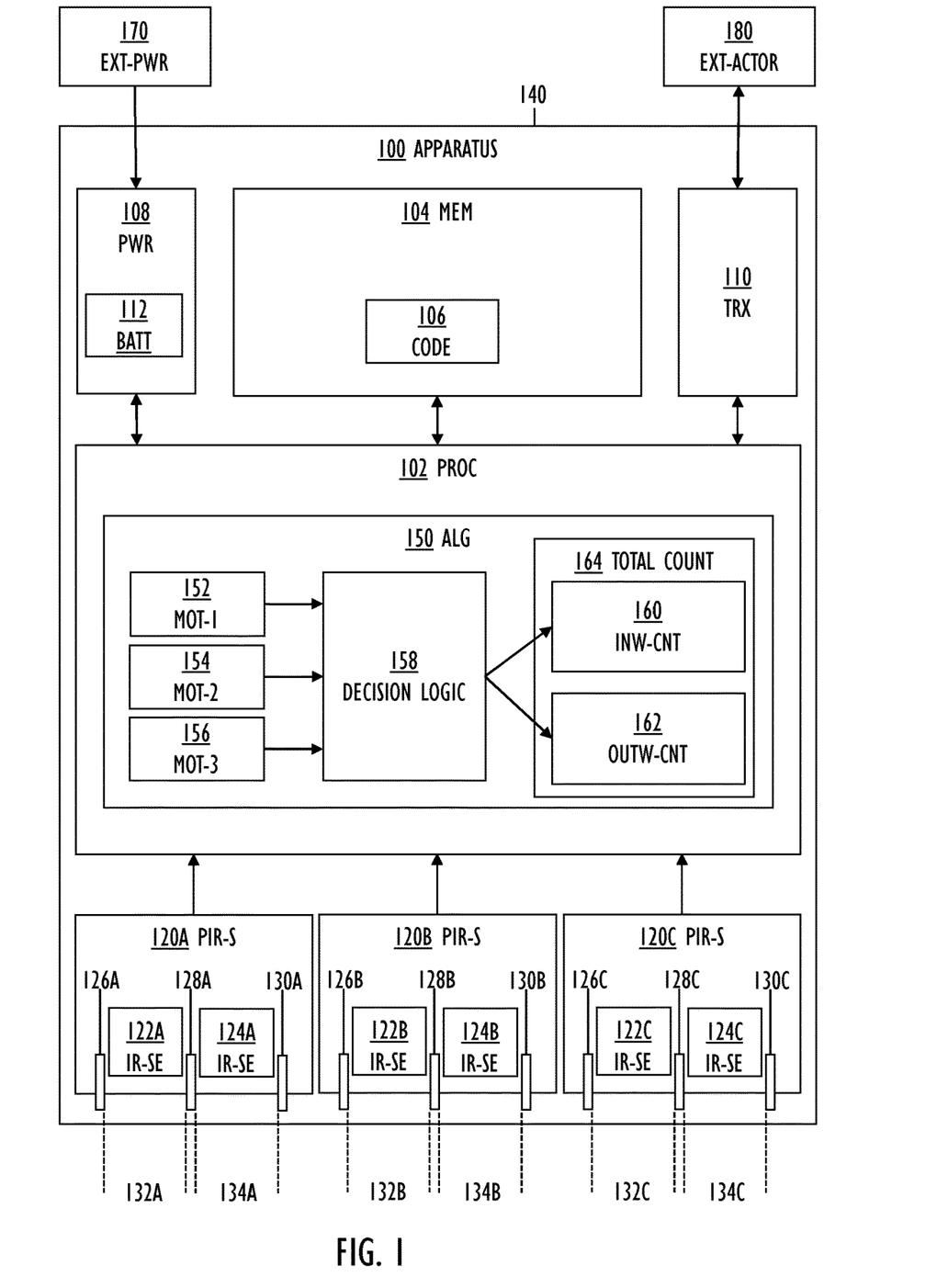
FIG. 1 illustrates embodiments of an apparatus for counting objects.
Figure 2:
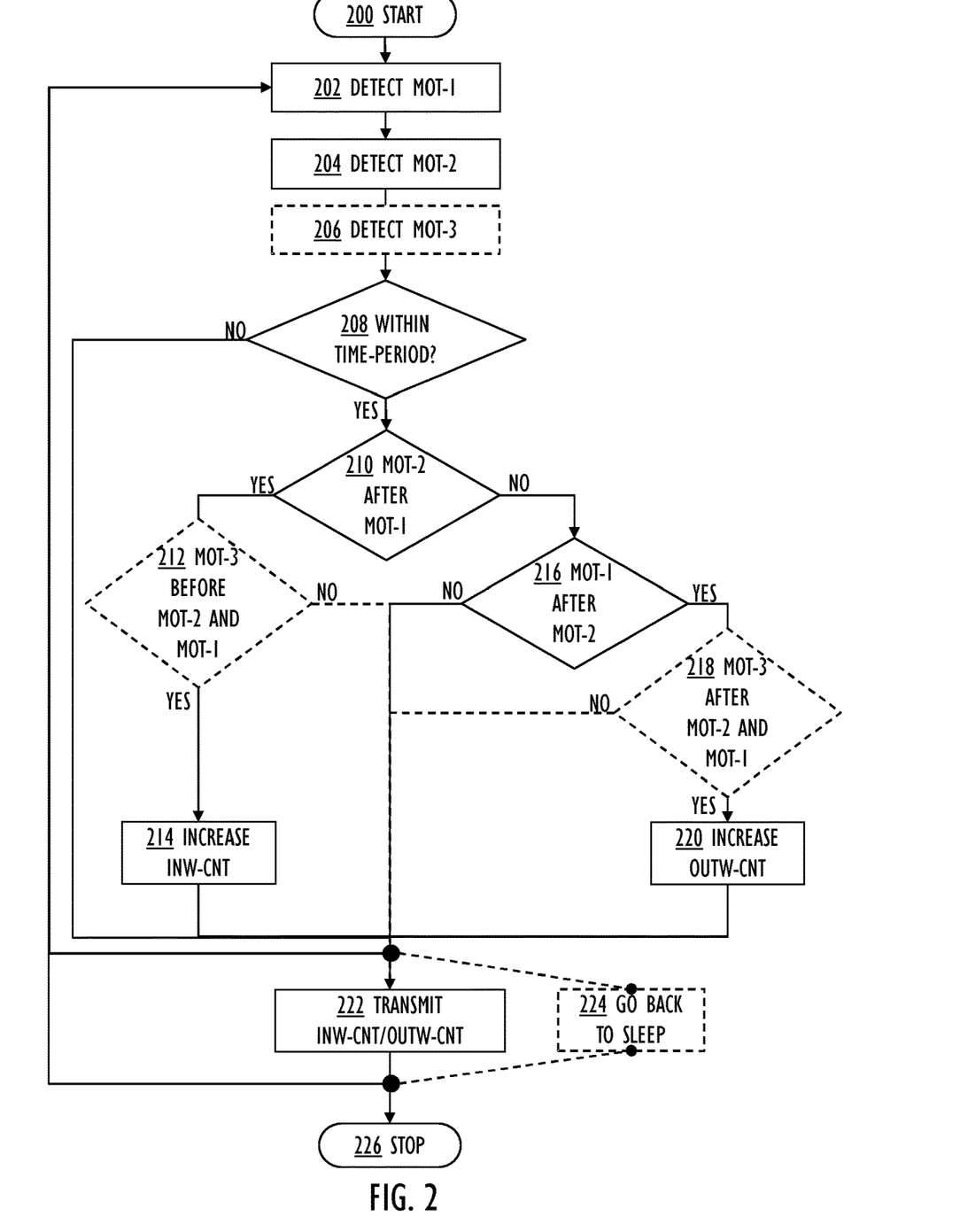
FIG. 2 is a flow chart illustrating embodiments of an algorithm running in the apparatus for counting objects.

Let us study simultaneously FIG. 1, which illustrates embodiments of an apparatus 100 for counting objects, and FIG. 2, which illustrates embodiments of a method for counting objects. The method may be implemented as an algorithm 150 programmed as computer program code 106, executed by the apparatus 100 as a special purpose computer.

The apparatus 100 comprises one or more memories 104 including computer program code 106, and a processor 102 to execute the computer program code 106 to cause the apparatus 100 to perform the algorithm 150.

The term 'processor' 102 refers to a device that is capable of processing data. When designing the implementation of the processor 102, a person skilled in the art will consider the requirements set for the size and power consumption of the apparatus 100, the necessary processing capacity, production costs, and production volumes, for example.

The term 'memory' 104 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

A non-exhaustive list of implementation techniques for the processor 102 and the memory 104 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 106 may be implemented by software. In an embodiment, the software may be written by a suitable programming language, and the resulting executable code may be stored in the memory 104 and executed by the processor 102.

The computer program code 106 implements the algorithm 150 for counting objects. The computer program code 106 may be coded as a computer program (or software) using a programming language, which may be a high-level programming language, such as C, C++, or Java, or a low-level programming language, such as a machine language, or an assembler, for example. The computer program code 106 may be in source code form, object code form, executable file, or in some intermediate form. There are many ways to structure the computer program code 106: the operations may be divided into modules, sub-routines, methods, classes, objects, applets, macros, etc., depending on the software design methodology and the programming language used. In modern programming environments, there are software libraries, i.e. compilations of ready-made functions, which may be utilized by the computer program code 106 for performing a wide variety of standard operations. In addition, an operating system (such as a general-purpose operating system) may provide the computer program code 106 with system services.

In an embodiment, the processor 102 may be implemented as a microprocessor implementing functions of a central processing unit (CPU) on an integrated circuit. The CPU is a logic machine executing the computer program code 106. The CPU may comprise a set of registers, an arithmetic logic unit (ALU), and a control unit (CU). The control unit is controlled by a sequence of the computer program code 106 transferred to the CPU from the (working) memory 104. The control unit may contain a number of microinstructions for basic operations. The implementation of the microinstructions may vary, depending on the CPU design.

In an embodiment, the processor 102 and the one or more memories 104 are implemented as a microcontroller, possibly with a full suite of program and system development tools, maybe even with software libraries and a real-time operating system.

The apparatus 100 also comprises a power source 108. In an embodiment, the apparatus 100 is configured to use a long-life battery 112 as the power source 108. The battery 112 may be rechargeable. Alternatively, or additionally, the power source 108 may be coupled permanently or as required (by service personnel, for example) to an external power 170, such as mains electricity or an accumulator. The power source 108 may receive the electric power via a USB interface, for example. The battery 112 may be recharged via the USB interface.

The apparatus 100 also comprises a radio transceiver 110. The radio transceiver 110 may operate using a standard or proprietary wireless communication protocol. The radio transceiver 110 may utilize a cellular radio network (GSM, GPRS, EGPRS, WCDMA, UMTS, 3GPP, IMT, LTE, LTE-A, 3G, 4G, 5G etc.), a wireless local area network (such as WLAN, Wi-Fi, etc.), a short-range radio network (such as Bluetooth or Bluetooth Low Energy BLE, etc.), or a wireless mesh network, for example. The use of the cellular radio network may necessitate use of a subscriber identity module (SIM), either as a physical chip, or as an embedded-SIM (eSIM), for example.

In an embodiment, the processor 102, the one or more memories 104, and the radio transceiver 110 are implemented as an integrated microcontroller.

The apparatus 100 also comprises two or more passive infrared (PIR) sensors 120A, 120B, 120C. While discussing the functionality of the apparatus, these two or more PIR sensors are referred to as a "first PIR sensor" 120A and a "second PIR sensor" 120B. Accordingly, the embodiments may be implemented with a minimum of two PIR sensors 120A, 120B, but also an embodiment using three PIR sensors 120A, 120B, 120C will be described. However, it is envisaged that for some applications or use cases even more than three PIR sensors 120A, 120B, 120C may be used with similar operating principles as will be described.

Each PIR sensor 120A, 120B, 120C comprises at least two infrared-sensitive elements 122A, 124A, 122B, 124B, 122C, 124C. Usually, the infrared-sensitive elements operate in pairs, i.e., each PIR sensor comprises two or four or even more infrared-sensitive elements. The infrared-sensitive elements within a pair are balanced.

Figure 3:
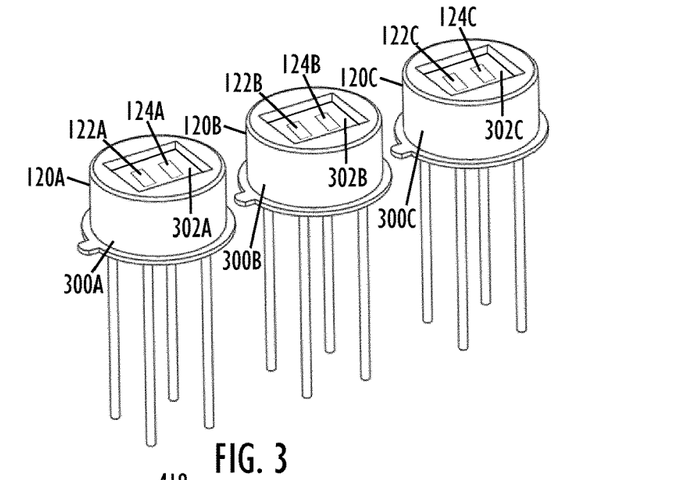
FIG. 3 illustrates example embodiments of PIR sensors.

As shown in FIG. 3, each PIR sensor 120A, 120B, 120C has two slots 122A, 124A, 122B, 124B, 122C, 124C made of a special material that is sensitive to the infrared radiation from the objects. The infrared sensitivity of the special material defines the sensitivity of the PIR sensor 120A, 120B, 120C. For the embodiments, the required sensing distance may be in the order of meters. In an embodiment, the infrared-sensitive elements 122A, 124A, 122B, 124B, 122C, 124C are low-power pyroelectric elements, suitable for long-term battery-powered 112 operation of the apparatus 100.

Figure 7:
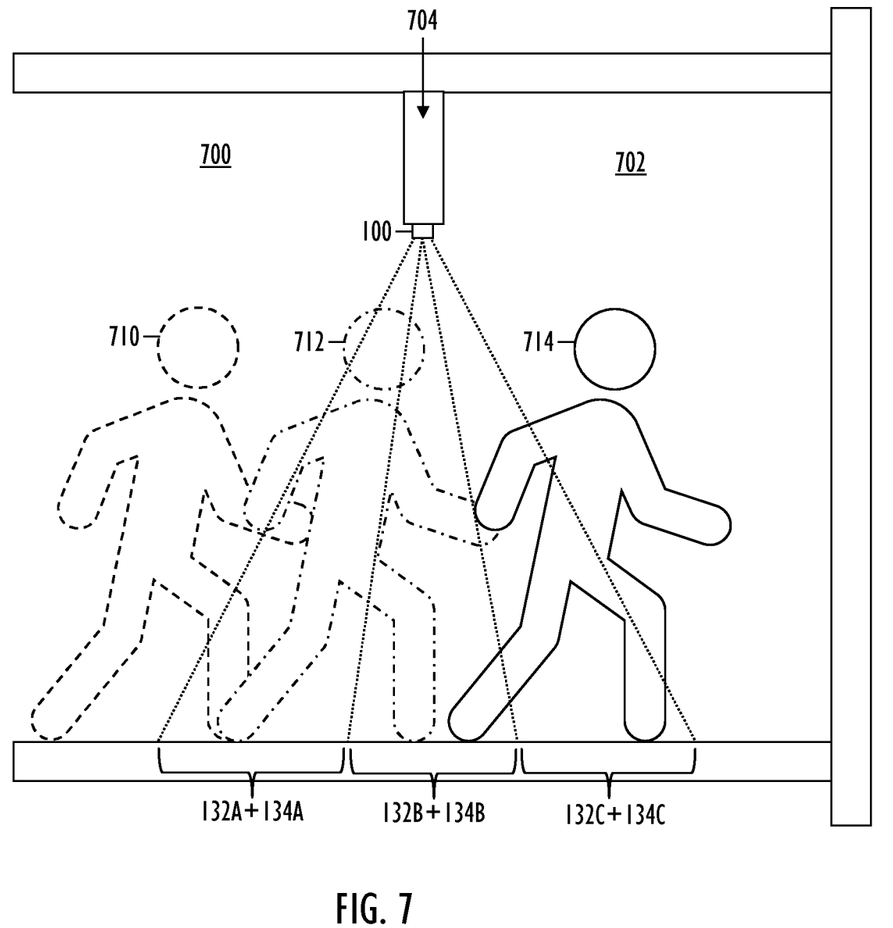
FIG. 7 illustrates example embodiments of the apparatus for counting objects in operation.

In an embodiment shown in FIG. 7, the apparatus 100 is configured to count human beings 714 as the counted objects. The sensitivity of the sensors 120A, 120B, 120C may be adjusted taking that into account.

FIG. 7 also illustrates that in an embodiment the apparatus 100 is configured to be attachable to an ingress/egress area 704. Such attachment may be implemented with screws or double-sided tape, or another suitable way for attaching the apparatus (to a building structure such as a doorway, for example). The ingress/egress area may be between two spaces 700, 702. The spaces 700, 702 may be portions in a building, for example, including, but not limited to: a room, a corridor, etc. The ingress/egress area 704 may be a doorway or an entrance, for example.

However, the apparatus 100 may be designed to count animals as the counted objects. It is also feasible that in some applications the counted objects may be inorganic.

Let us take the first PIR sensor 120A as an example: if both slots 122A, 124A detect the same amount of infrared radiation (=an ambient amount radiated from a room, including walls, ceiling and floor, or even from outdoors), then the first PIR sensor 120A is idle. If a warm (warmer than the ambient temperature) or cold (colder than the ambient temperature) object passes the first PIR sensor 120A, the object first intercepts the first infrared-sensitive element 122A, which causes a positive differential change between the first infrared-sensitive element 122A and the second infrared-sensitive element 124A. Next, as the object intercepts the second infrared-sensitive element 124A, the reverse happens, which causes a negative differential change between the second infrared-sensitive element 124A and the first infrared-sensitive element 122A. Based on such signal differential changes, each PIR sensor 120A, 120B, 120C is capable of detecting motion. Note that also the direction of motion may be detected based on whether the negative differential change or the positive differential change is detected first.

As shown in FIG. 3, each PIR sensor 120A, 120B, 120C may be housed in a hermetically sealed casing 300A, 300B, 300C to improve noise, temperature and humidity immunity. Each infrared-sensitive element (or slot) 122A, 124A, 122B, 124B, 122C, 124C may be protected by an infrared-transparent protective cover (not illustrated in FIG. 3) covering a recess 302A, 302B, 302C containing the slots 122A, 124A, 122B, 124B, 122C, 124C. The covers may be made of coated silicon, or other thermally transparent material, for example.

In an embodiment, the apparatus 100 comprises a casing 140 to protect the electronics 102, 104, 108, 110, 120A, 120B, 120C against dust and moisture. If the infrared-sensitive elements (or slots) 122A, 124A, 122B, 124B, 122C, 124C have the aforementioned covers, the casing 140 may not need to protect these areas. This also improves the sensitivity of the PIR sensors 120A, 120B, 120C as there is no lens or similar optical structure covering the infrared-sensitive elements 122A, 124A, 122B, 124B, 122C, 124C.

Finally, the apparatus 100 comprises a mechanical field of view limiting structure 126A, 128A, 130A, 126B, 128B, 130B, 126C, 128C, 130C configured to limit the field of view 132A, 134A, 132B, 134B, 132C, 134C of each infrared-sensitive element 122A, 124A, 122B, 124B, 122C, 124C.

The field of views 132A and 134A, 132B and 134B, 132C and 134C of each infrared-sensitive element 122A and 124A, 122B and 124B, 122C and 124C within each PIR sensor 120A, 120B, 120C are adjacent to each other.

The field of views 132A and 134A, 132B and 134B, 132C and 134C between each PIR sensor 120A, 120B, 120C are side by side.

Note that the field of view limiting structure is "mechanical", whereby aforementioned problems related to the use of lenses or mirrors are avoided.

In an embodiment, the mechanical field of view limiting structure 126A, 128A, 130A, 126B, 128B, 130B, 126C, 128C, 130C is configured to operate without any optical elements including a lens, a mirror, or other optical element configured to direct infrared radiation emitting from the objects.

The mechanical field of view limiting structure may be made of separate or more or less integrated structures, or of a single solid block. Let us next study these various embodiments with reference to FIG. 1 and FIG. 4.

As shown in FIG. 1, the mechanical field of view limiting structure comprises a wall 128A, 128B, 128C between each infrared sensitive element 122A and 124A, 122B and 124B, 122C and 124C of the PIR sensor 120A, 120B, 120C to limit the field of view 132A, 134A, 132B, 134B, 132C, 134C of each infrared-sensitive element 122A, 124A, 122B, 124B, 122C, 124C. The mechanical field of view limiting structure also comprises a wall 130A and 126B, and 130B and 126C between each side by side PIR sensor 120A, 120B, 120C.

Note that FIG. 1 rather describes such walls 126A, 128A, 130A, 126B, 128B, 130B, 126C, 128C, 130C, in principle and their actual implementation may vary. For example, between the first PIR sensor 120A and the second PIR sensor 120B, the walls 130A, 126B may be integrated into a single wall, or they may be separate as shown. The same applies to the walls 130B, 126C between the second PIR sensor 120B and the third PIR sensor 120C. Note also that the walls 126A, 128A, 130A, 126B, 128B, 130B, 126C, 128C, 130C may be of different form and directed differently; they may be slanted and/or curved, for example.

Figure 4:
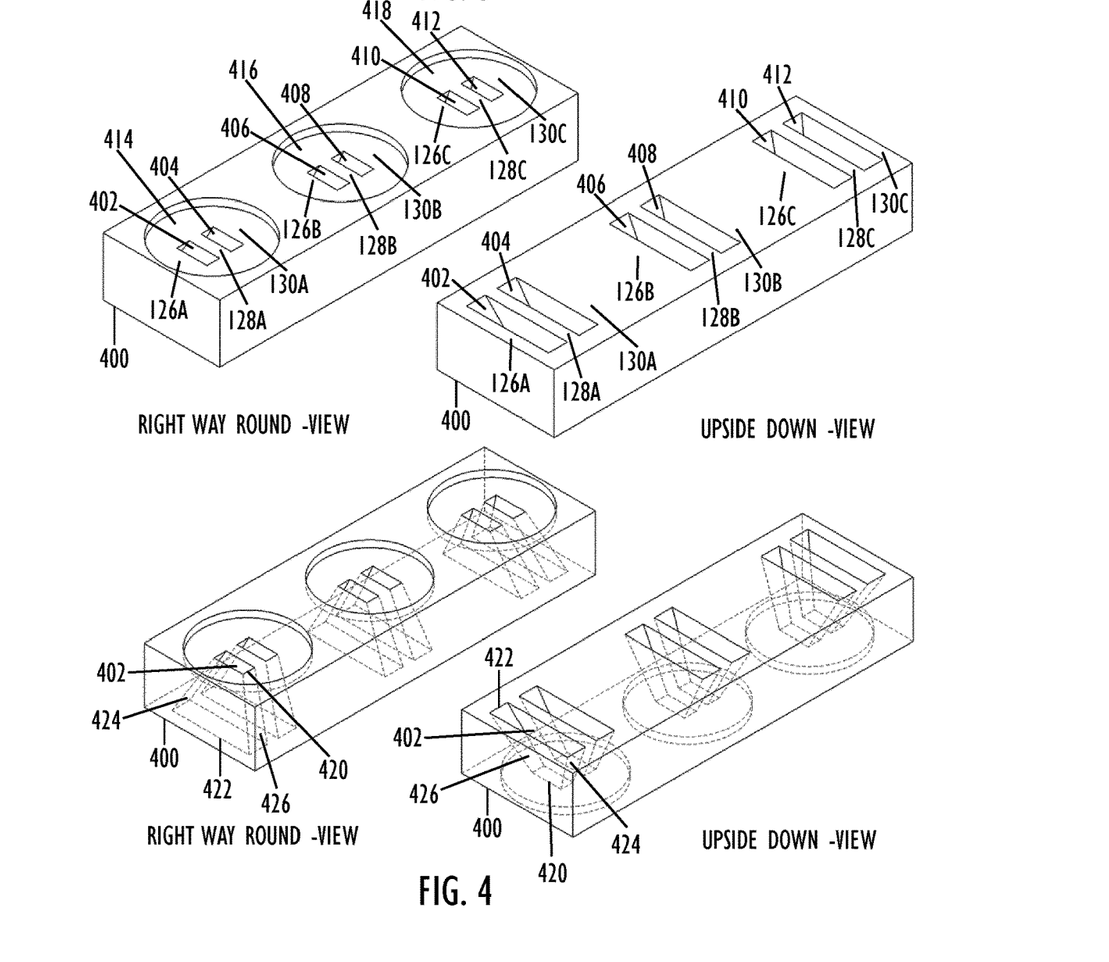
FIG. 4 illustrates example embodiments of a mechanical field of view limiting structure.

In an embodiment shown in FIG. 4, the mechanical field of view limiting structure 400 comprises a plurality of chambers 402, 404, 406, 408, 410, 412, each chamber 402, 404, 406, 408, 410, 412 configured to limit the field of view 132A, 134A, 132B, 134B, 132C, 134C of each infrared-sensitive element 122A, 124A, 122B, 124B, 122C, 124C.

Although FIG. 4 illustrates these chambers 402, 404, 406, 408, 410, 412 as being manufactured into a solid block 400, they may be made of individual structures, such as from pipe-like structures.

In an embodiment, each chamber 402, 404, 406, 408, 410, 412 is configured to act as a directing waveguide for the infrared radiation emitting from the objects into each infrared sensitive element 122A, 124A, 122B, 124B, 122C, 124C.

In an embodiment, also illustrated in FIG. 4, the mechanical field of view limiting structure is a solid block 400 with a separate cut-out 402, 404, 406, 408, 410, 412 for each infrared-sensitive element 122A, 124A, 122B, 124B, 122C, 124C configured so that sides 420 of the cut-out 402 surround the infrared-sensitive element 122A, and sides 422 of the cut-out 402 towards the objects are wider apart than sides 420 of the cut-out 402 towards the infrared-sensitive element 122A.

In an embodiment, the cut-out 402 placed against the infrared-sensitive element 122A is of a first shape 420, and the cut-out 402 facing the objects is of a second shape 422, and a square area of the first shape 420 is smaller than a square area of the second shape 422. In an embodiment illustrated in FIG. 4, the first shape 420 and the second shape 422 are rectangular shapes. Note that also other shapes (such as circles or semi-circles, for example) may be implemented by forming the walls/chambers/waveguides/cut-outs/funnels as required by the application.

In an embodiment, the mechanical field of view limiting structure 126A, 128A, 130A, 126B, 128B, 130B, 126C, 128C, 130C; 400; 402, 404, 406, 408, 410, 412 is configured to funnel infrared radiation emitting from the objects to the infrared-sensitive elements 122A, 124A, 122B, 124B, 122C, 124C from different locations. The funnelling or directing effect for the infrared radiation may be achieved by having slanted walls 424, 226 for the walls/chambers/waveguides/cut-outs/funnels 402, 404, 406, 408, 410, 412. Note that these terms are not synonyms, but highlight different aspects related to the infrared radiation guiding.

Note that these various mechanical structures, walls, chambers, waveguides, cut-outs and funnels, operate so that they direct infrared radiation, and thus are not infrared-transparent but infrared-blocking. Wall thickness of the mechanical structures is also taken into account in design of the apparatus 100 as it has an effect on the propagation of the infrared transmission.

Figure 5:
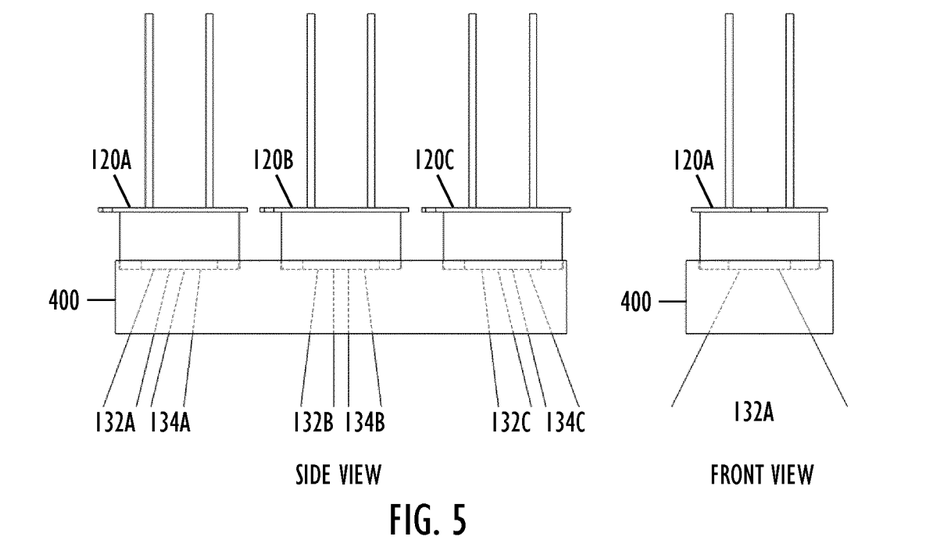
FIG. 5 and FIG. 6 illustrate example embodiments of field of views.
Figure 6:
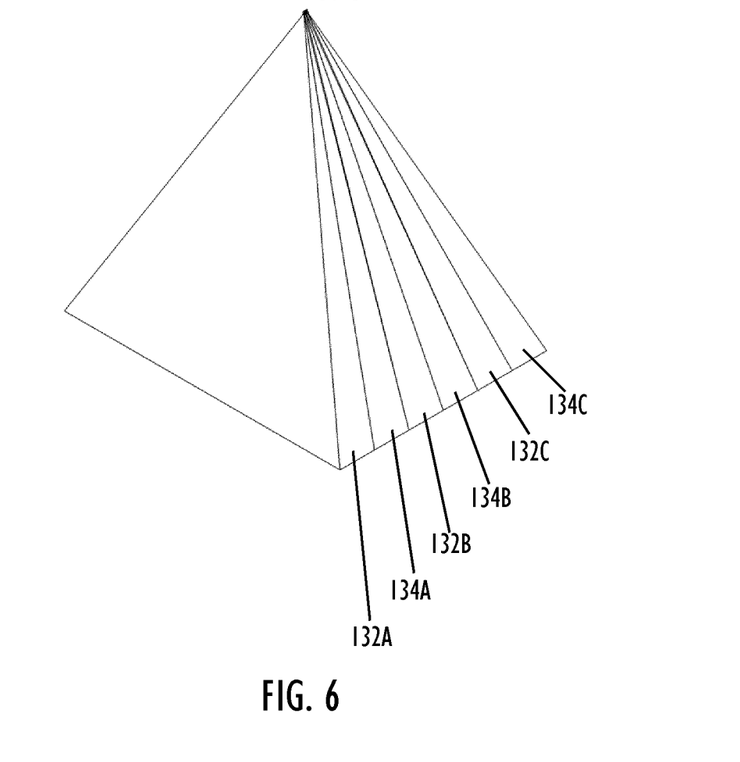

FIG. 5 illustrates on the left side that the field of views 132A, 134A, 132B and 134B, 132C and 134C of the PIR sensors 120A, 120B, 120C are adjacent and side by side, each with a specific detection breadth. The right side of FIG. 5 illustrates that each field of view 132A also has a specific detection depth. FIG. 6 illustrates the breadth and depth of each field of view 132A, 134A, 132B, 134B, 132C, 134C.

Let us now study the algorithm/method with reference to FIG. 2.

The method starts in 200 and ends in 226. Note that the method may run as long as required (after the start-up of the apparatus 100 until switching off) by looping back to an operation 202.

The operations are not strictly in chronological order in FIG. 2, and some of the operations may be performed simultaneously or in an order differing from the given ones. For example, operations 210 and 216 may be executed in parallel or in a combined operation. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

In 202, by the first PIR sensor 120A, a first motion of an object is detected based on signal differential changes between its two infrared-sensitive elements 122A, 124A.

In 204, by the second PIR sensor 120B, a second motion of the object is detected based on signal differential changes between its two-infrared-sensitive elements 122B, 124B.

If the second motion is detected within a predetermined time period after the first motion, an inward count 160 of objects moving to a direction from the first PIR sensor 120A to the second PIR sensor 120B is increased in 214.

Or if the first motion is detected within a predetermined time period after the second motion, an outward count 162 of objects moving to a direction from the second PIR sensor 120B to the first PIR sensor 120A is increased.

In our example of FIG. 2, these two condition clauses forming decision logic 158 are implemented with three successive tests. Note that these two condition clauses may also be implemented with another kind of decision logic 158; the order of tests 210 and 216 may be the other way around, for example.

In the first test 208, it is tested whether the first motion and the second motion were detected within the predetermined time period. This may be implemented by a timer or another suitable operation. If this condition is fulfilled 208-YES, the second test 210 is entered, else 208-NO it is determined that the second test 210 nor the third test 216 need not be entered.

20 In the second test 210, it is tested whether the second motion is detected after the first motion. If this condition is fulfilled 210-YES, the inward count 160 of objects is increased in 214, else 210-NO the third test 216 is entered.

In the third test 216, it is tested whether the first motion is detected after the second motion. If this condition is fulfilled 216-YES, the outward count 162 of objects is increased in 220, else 216-NO nothing is done (note that logically this else clause should not happen, i.e., it may indicate some kind of an error).

After the two condition clauses have been evaluated, the inward count 160 of objects and/or the outward count 162 of objects is transmitted in 222 using the radio transceiver 110. The recipient of these transmissions may be an external actor 180, including but not limited to: a server computer, a user apparatus such as a laptop, pad, or smartphone, or some other external computing resource capable of directly or indirectly receiving the transmission from the apparatus 100.

Note that the inward count 160 of objects and the outward count 162 of objects may be combined into a single total count variable 164. The counting logic may be such that the total count 164 represents a count of objects that are "in" (the number of objects that have entered a certain space such as a room, for example).

As was explained earlier, the two or more PIR sensors 120A, 120B, 120C may comprise a third PIR sensor 120C.

FIG. 7 illustrates an embodiment, wherein the mechanical field of view limiting structure 126C, 128C, 130C is configured to limit the field view 132C, 134C of the third PIR sensor 120C to be on the other side of the second PIR sensor 120B as the first PIR sensor 120A.

As was explained earlier, the apparatus 100 is attached to the ingress/egress area 704 between two spaces 700, 702.

The embodiments described so far has operated with two PIR sensors 120A, 120B, whereby the person 714 entering the space 702 is detected by the two zones: 132A+134A and 132B+134B.

Now, the embodiment with the third PIR sensor 120C adds an operation 206 to the algorithm 150 using the third zone 132C+134C: detecting, by the third PIR sensor 120C, a third motion of the object based on signal differential changes between its two-infrared-sensitive elements 122C, 124.

The embodiment with the third PIR sensor 120C also adds two new tests 212 and 218 to the decision logic 158 of the algorithm 150.

If the third motion is detected within the predetermined time period after the second motion and the first motion is detected (this condition is fulfilled with the following results from the tests: 208-YES and 210-YES and 212-YES), the inward count 160 of objects moving to the direction from the first PIR sensor 120A to the second PIR sensor 120B to the third PIR sensor 120C is increased in 214.

Or if the third motion is detected within the predetermined time period before the second motion and the first motion is detected (this condition is fulfilled with the following results from the tests: 208-YES and 216-YES and 218-YES), the outward count 162 of objects moving to the direction from the third PIR sensor 120C to the second PIR sensor 120B to the first PIR sensor 120A is increased in 220.

As shown in FIG. 7, the person 714 entering the space 702 is now detected in three phases: 710, 712 and 714. Only if all these three phases are fulfilled, is the person detected as having entered the space 702. For example, if s/he turns back after phase 712, the detection is not performed.

As was mentioned earlier, for some applications or use cases even more than three PIR sensors 120A, 120B, 120C may be used with similar operating principles as described. For example, there may be a tunnel, corridor, or similar elongated structure, wherein the counted objects move. This necessitates more (six, for example) PIR sensors 120B, 120B, 120C. Two objects may simultaneously enter the elongated structure from opposite ends and such situations may be easier to detect and process with more than three PIR sensors 120A, 120B, 120C.

In an embodiment, the processor 102 is configured to sleep. This may be implemented so that this is the default state, whereby power consumption is minimized (so that the battery lasts longer, for example). The processor 102 is configured to wake-up after one of the two or more PIR sensors 120A, 120B, 120C detects 202, 204, 206 motion (the first motion, the second motion, or the third motion). After the wake-up, the algorithm 158 may run as long as required to complete the processing. The processor 102 is configured to go back to sleep in 224 after the predetermined time period is passed and the inward count 160 of objects or the outward count 162 of objects is not increased or after the inward count 160 of objects and/or the outward count 162 of objects has been transmitted 222. In this way, the apparatus 100 saves power, and, if the count 160, 162, 164 has not changed, the radio transmitter 110 does not need to be used, whereby further power savings may be achieved.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. An apparatus configured to count objects, comprising:
a power source;
a radio transceiver;
two or more passive infrared sensors, comprising a first passive infrared sensor and a second passive infrared sensor, each passive infrared sensor comprising at least two infrared-sensitive elements;
a mechanical field of view limiting structure configured to limit the field of view of each infrared-sensitive element, wherein the field of views of each infrared-sensitive element within each passive infrared sensor are adjacent to each other, and the field of views between each passive infrared sensor are side by side;
one or more memories including computer program code; and
a processor configured to execute the computer program code to cause the apparatus to perform at least the following:
detecting, by the first passive infrared sensor, a first motion of an object based on signal differential changes between its two infrared-sensitive elements;
detecting, by the second passive infrared sensor, a second motion of the object based on signal differential changes between its two-infrared-sensitive elements;
if the second motion is detected within a predetermined time period after the first motion, increasing an inward count of objects moving to a direction from the first passive infrared sensor to the second passive infrared sensor, or if the first motion is detected within a predetermined time period after the second motion, increasing an outward count of objects moving to a direction from the second passive infrared sensor to the first passive infrared sensor; and
transmitting, using the radio transceiver, the inward count of objects and/or the outward count of objects,
wherein the mechanical field of view limiting structure is a solid block with a separate cut-out for each infrared-sensitive element configured as a chamber configured to limit the field of view of each infrared-sensitive element so that sides of the cut-out surround the infrared-sensitive element, and sides of the cut-out towards the objects are wider apart than sides of the cut-out towards the infrared-sensitive element so that slanted walls between the cut-out surrounding the infrared-sensitive element and the cut-out towards the objects are configured to funnel infrared radiation emitting from the objects to each infrared-sensitive element from different locations, each chamber acting as a directing waveguide.

2. The apparatus of claim 1, wherein the two or more passive infrared sensors comprise a third passive infrared sensor, the mechanical field of view limiting structure is configured to limit the field view of the third passive infrared sensor to be on the other side of the second passive infrared sensor as the first passive infrared sensor, and the apparatus is caused to perform the following:
detecting, by the third passive infrared sensor, a third motion of the object based on signal differential changes between its two-infrared-sensitive elements; and
if the third motion is detected within the predetermined time period after the second motion and the first motion is detected, increasing the inward count of objects moving to the direction from the first passive infrared sensor to the second passive infrared sensor to the third passive infrared sensor, or if the third motion is detected within the predetermined time period before the second motion and the first motion is detected, increasing the outward count of objects moving to the direction from the third passive infrared sensor to the second passive infrared sensor to the first passive infrared sensor.

3. The apparatus of claim 1, wherein the mechanical field of view limiting structure comprises a wall between each infrared sensitive element of the passive infrared sensor to limit the field of view of each infrared-sensitive element, and the mechanical field of view limiting structure comprises a wall between each side by side passive infrared sensor.

4. The apparatus of claim 1, wherein the cut-out placed against the infrared-sensitive element is of a first shape, and the cut-out facing the objects is of a second shape, and a square area of the first shape is smaller than a square area of the second shape.

5. The apparatus of claim 1, wherein the mechanical field of view limiting structure is configured to operate without any optical elements including a lens, a mirror, or other optical element configured to direct infrared radiation emitting from the objects.

6. The apparatus of claim 1, wherein the apparatus comprises a casing to protect the electronics against dust and moisture.

7. The apparatus of claim 1, wherein the apparatus is configured to be attachable to an ingress/egress area.

8. The apparatus of claim 1, wherein the apparatus is configured to count human beings as the counted objects.

9. The apparatus of claim 1, wherein the infrared-sensitive elements are low-power pyroelectric elements.

10. The apparatus of claim 1, wherein the apparatus is configured to use a long-life battery as the power source.

11. The apparatus of claim 1, wherein the processor is configured to sleep, wake-up after one of the two or more passive infrared sensors detects motion, and go back to sleep after the predetermined time period is passed and the inward count of objects or the outward count of objects is not increased or after the inward count of objects and/or the outward count of objects has been transmitted.

* * * * *